No. 691,870. Patented Jan. 28, 1902.
F. PILLING.
DOOR BOLT.
(Application filed Oct. 8, 1901.)
(No Model.)

Witnesses:
H. M. Long.
Ada C. Briggs.

Inventor:
Frederick Pilling
by Wm. W. Finckel
Atty.

UNITED STATES PATENT OFFICE.

FREDERICK PILLING, OF WASHINGTON, DISTRICT OF COLUMBIA.

DOOR-BOLT.

SPECIFICATION forming part of Letters Patent No. 691,870, dated January 28, 1902.

Application filed October 8, 1901. Serial No. 77,995. (No model.)

*To all whom it may concern:*

Be it known that I, FREDERICK PILLING, a citizen of the United States, residing at Washington, in the District of Columbia, have invented a certain new and useful Improvement in Door-Bolts, of which the following is a full, clear, and exact description.

The object of this invention is to provide a door-bolt that may be readily applied, repaired, and replaced by means of self-contained fasteners.

In carrying out my invention I use a base-plate for the bolt proper and a base-plate for the keeper, and I mount the bolt in bearings in connection with the plate and provide a keeper in the form of an eye and supply the bearings and eye with screws, which are passed through suitable openings in the plates and serve the double purpose of securing the plates and themselves in position, and in this way the component parts of a bolt may be applied without the use of extraneous screws or other fastenings not a part of the mechanism itself.

Having thus stated the principle of my invention, I will proceed now to explain the best mode in which I have contemplated applying that principle and then will particularly point out and distinctly claim the part, improvement, or combination which I claim as my invention.

Figure 1:
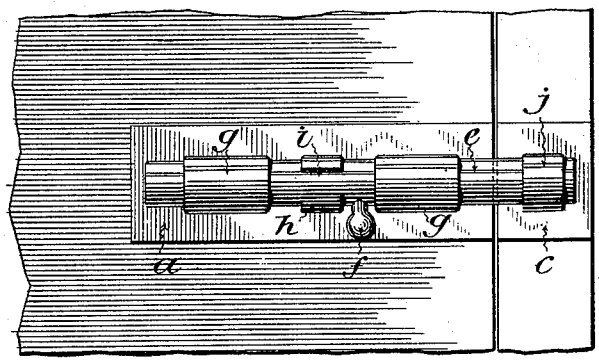
Figure 2:
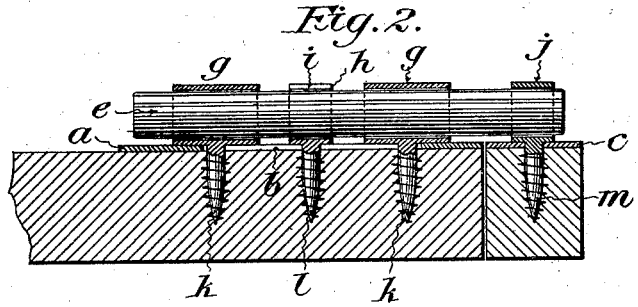
Figure 2:
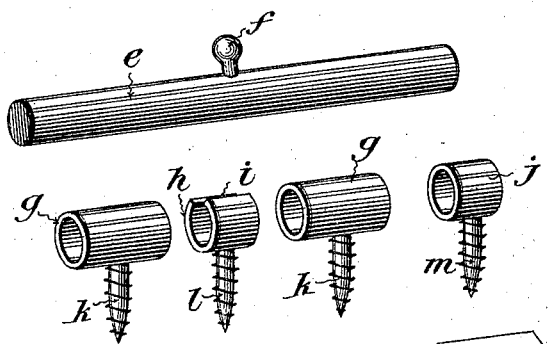
Figure 3:
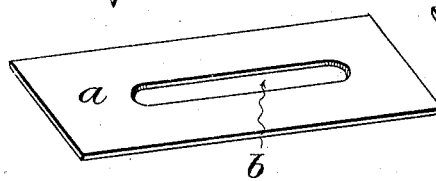

In the accompanying drawings, illustrating my invention, in the several figures of which like parts are similarly designated, Figure 1 is an elevation of the bolt applied to a door. Fig. 2 is a longitudinal section with the bolt itself in elevation. Fig. 3 shows in perspective the component parts of the bolt.

Ordinarily a door-bolt of the class to which my invention particularly belongs is composed of a base-plate upon which three tubular bearings are mounted in alinement, the middle bearing usually being shorter than the end bearings and slit longitudinally to form a catch for coöperation with a knob or handle on the bolt proper for locking the said bolt in either the locked or unlocked position. The keeper likewise is composed of a plate upon which a single tubular bearing is mounted. These two parts—namely, the plate with the three bearings for the bolt itself and the keeper-plate—are in the ordinary form of bolt secured to a door or other object by means of extraneous screws passed through countersunk holes in the plates, and commonly there are six screws for the plate carrying the bolt and two screws for the plate carrying the keeper. The application therefore of the bolt is attended with some labor and considerable consumption of time, and there are no facilities for repairing in case of damage of any of the parts.

In the present invention I dispense entirely with extraneous fastenings, and to this end use a bolt-plate $a$, which may have a series of slots or holes or a continuous slot $b$. The keeper-plate $c$ also has a hole $d$. The bolt itself (designated $e$) may be a cylinder of metal, as usual, and provided with an operating knob or handle $f$. Three bearing-pieces, practically cylindrical tubes, are employed to receive the bolt and connect it with the plate $a$, and the end bearings $g\ g$ may be substantially alike, while the intermediate bearing $h$ is slit longitudinally, as at $i$, for the passage through it and to one side or the other of it of the knob or handle $f$ of the bolt, as is usual in this class of bolts. The keeper $j$ is also a cylindrical tube, as usual. My invention consists in making these several tubular portions $g$, $h$, and $j$ separate from the plates $a$ and $c$ and providing each of them in any suitable manner with a screw-point $k\ l\ m$.

In assembling the bolt upon a door or other object the bolt-plate $a$ is placed in the desired position, and then the screw-bearing pieces $g$ and $h$ have their screw-points passed through the slot or slots $b$ and driven into the wood of the door until these several bearing-pieces bind upon the plate sufficiently to hold it in place and themselves are brought into alinement. The bolt is then applied in these bearing-pieces and afterward the knob $f$ put in position in the bolt, so that the knob will occupy a place between the bearings $g\ g$ and be capable of coöperation with the slitted bearing $h$ for locking the bolt in either the locked or unlocked position. The keeper-plate $c$ is then alined with the plate $a$, and it is secured in position by means of the screw of the keeper

*j*, which screw passes through the opening *d* of the plate and into the wood of the doorframe. Thus is obviated the necessity for the use of any fastening devices not an integral or self-contained part of the bolt.

Obviously should any of the bearing-pieces *g*, *h*, or *j* become damaged they may be removed and replaced without the necessity of furnishing an entirely new bolt.

I do not limit my invention to the material of which the parts are made and merely suggest that they may be made from the commonest or most expensive kind of stock.

It is within my invention to dispense with the bolt-plate and the keeper-plate, either or both; but ordinarily these will be employed.

By the use of the terms "self-contained" and "self-fastening" as applied to my bolt I wish to be understood as meaning a bolt whose casing or bearings and keeper carry their own fastening devices or whose fastening devices are part and parcel of the casing, bearings, and keeper as opposed to a bolt which requires extraneous fastenings.

What I claim is—

1. A self-fastening bolt, comprising a bolt proper, a bolt-plate, a keeper-plate, bearings for the bolt, and an eye for the keeper, the several bearings and the eye being provided with permanent screw-points by means of which the respective plates and the bearings and eye are secured in position, substantially as described.

2. A door-bolt, in which the bearings for the bolt are made with integral attaching screw-points, substantially as described.

3. A door-bolt, comprising a bolt proper, and a series of tubes provided with permanent attaching screw-points, and constituting bearings and keeper for the bolt, substantially as described.

In testimony whereof I have hereunto set my hand this 7th day of October, A. D. 1901.

FREDERICK PILLING.

Witnesses:
WM. H. FINCKEL,
E. A. FINCKEL.